Oct. 14, 1969     M. H. GROVE     3,472,276
VALVE OPERATING AND INDICATING APPARATUS
Filed Feb. 27, 1967
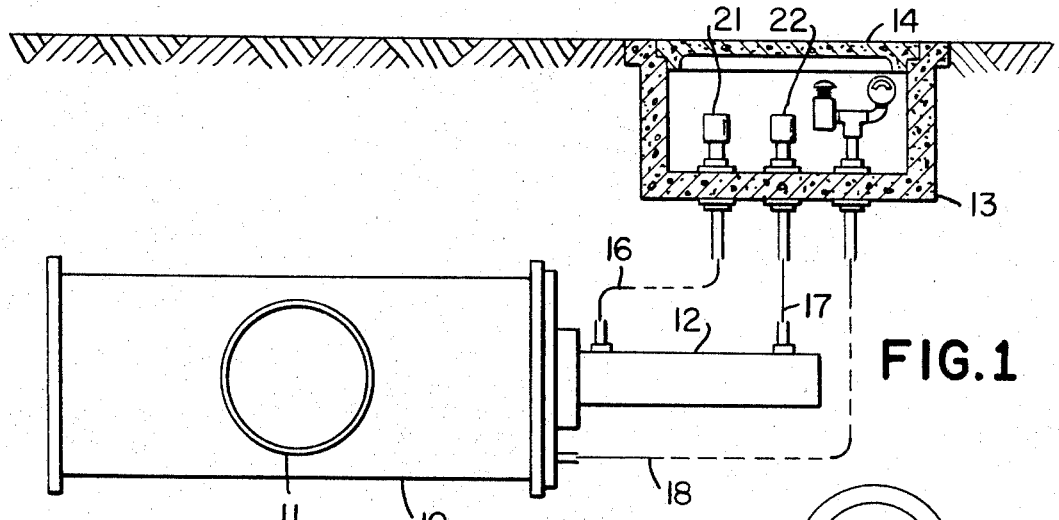
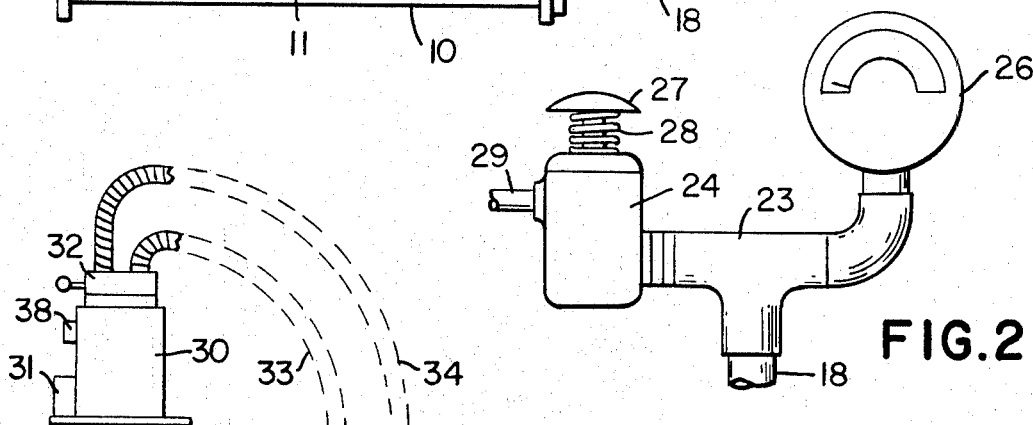
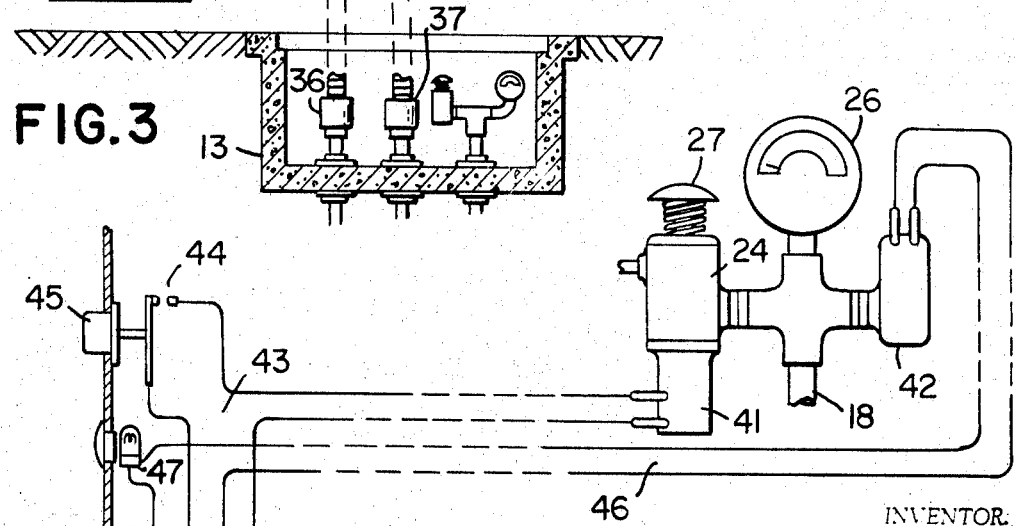
INVENTOR.
MARVIN H. GROVE
BY
ATTORNEYS

United States Patent Office 3,472,276
Patented Oct. 14, 1969

3,472,276
VALVE OPERATING AND INDICATING APPARATUS
Marvin H. Grove, Piedmont, Calif., assignor to M & J Valve Company, Houston, Tex., a corporation of Delaware
Filed Feb. 27, 1967, Ser. No. 618,678
Int. Cl. F16k 57/00
U.S. Cl. 137—552  4 Claims

ABSTRACT OF THE DISCLOSURE

Operating and indicating apparatus for hydraulically operated gate valves where the valve and its hydraulic motor are located below the surface of the ground or immersed in water. Three pipe lines connect with the valve and extend to the surface of the ground where they are accessible at an operating and indicating station. Two lines can be connected with a hydraulic system for operating the valve motor. The third line connects with the valve body space and has a vent valve and indicating means at the operating station.

Background of the invention and objects

One type of gate valve which has been widely used in connection with pipe line systems consists of a flat gate having a port adapted to register with the flow passages of the valve body for open valve position, and equipped with annular sealing assemblies which engage opposite sides of the gate. Such a valve is disclosed in Patent 3,260,503 taken together with Patent 3,269,695 which shows a sealing assembly. Such a valve is characterized by the fact that a seal is established between the body and the gate on the upstream side, whereby the body space of the valve can be vented to atmospheric pressure when the gate is either in full open or closed positions. When the gate is in an intermediate position between full open and closed positions, the body space communicates with the upstream side of the valve through the gate port.

Various types of hydraulic operators have been provided for the power operation of such valves. Such operators generally consist of a double-acting motor which is attached to the operating rod of the valve and which in turn is connected to a hydraulic system which supplies hydraulic liquid under pressure to the motor during a cycle of operation. A simple hydraulic motor is one of the double-acting hydraulic jack type with its cylinder directly mounted upon the bonnet end of the valve body, and its piston directly connected with the operating rod of the valve. When such valves are installed above the ground surface it is a simple matter to determine when the valve gate is being moved from one position to another. The valve is provided with visual indicating means for this purpose such as a rod which connects with the piston of the hydraulic jack and extends from one end of the jack cylinder where it is plainly visible. However, a problem is involved when such a valve with its hydraulic operator is buried below the ground surface, or submerged in a body of water, because then the indicator rod or other visual indicating means cannot be used. This has discouraged the use of valves that are hydraulically operated when it is necessary to install them buried in the ground or submerged in water.

In general it is an object of the present invention to provide valve operating and indicating apparatus which makes it feasible to use hydraulically operated gate valves where it is necessary to have them buried or submerged in water.

Another object of the invention is to provide apparatus of the above character which facilitates the operation of buried or submerged gate valves from a convenient operating station, and which makes it possible for personnel to confirm that an operating cycle is taking place.

Additional objects and features of the invention will appear from a subsequent portion of this specification where preferred embodiments are set forth in detail in conjunction with the accompanying drawing.

Summary of the invention

An operating station, such as a compact access box, is provided at the surface of the ground or above the water surface in the general vicinity where the gate valve is buried or submerged. The valve is of the type previously mentioned, that is, a gate valve having a flat gate with a port adapted to register with the flow passages of the body, and with sealing assemblies that provide a seal on the upstream side. The gate is connected to a double-acting hydraulic motor, such as a double-acting hydraulic ram. Three pipe lines connect between the valve and the operating station. Two lines connect with the hydraulic motor, and at the operating station they are adapted to make connection with a hydraulic liquid system. The other line connects with the body space and at the operating station is provided with a vent valve. When it is desired to operate the valve the ends of the first two pipes at the operating station are connected with a hydraulic operating system, and for carrying out an operating cycle the vent valve is manipulated to appraise the operator of the fact that the operating cycle is moving the gate between one position and another.

Brief description of the drawing

FIGURE 1 is a schematic side elevational view illustrating a buried gate valve and an operating and indicating station.

FIGURE 2 is a side elevational view schematically illustrating the vent valve and pressure gauge incorporated in FIGURE 1.

FIGURE 3 is a detail schematically illustrating how a hydraulic unit is employed at the operating station.

FIGURE 4 illustrates another embodiment of the indicating means which employs electrical circuitry for indication at a remote station.

Description of the preferred embodiments

In FIGURE 1 the gate valve 10 is shown buried in the ground together with the pipe line 11 with which it is connected. This gate valve may be of the through port type disclosed in said Patent 3,260,503 and having sealing assemblies of the type disclosed in Patent 3,269,695. A hydraulic motor 12 in the form of a double-acting hydraulic jack is shown mounted upon the bonnet end of the valve body. It is assumed that the piston is directly connected to the operating rod of the valve. At the surface of the ground there is a box 13 provide with the removable cover 14 and forming an operating and indicating station. Pipe lines 16 and 17 connect with the hydraulic motor 12 and extend into the box 13. A third pipe line 18 connects through the bonnet end of the valve body with the interior body space, and likewise extends into the box 13.

Within the box 13 the ends of the pipe lines 16 and 17 are provided with the fittings 21 and 22. The corresponding end of the pipe line 18 is shown connected by T 23 to the manually operated vent valve 24 and the pressure gauge 26. The vent valve 24 is shown provided with an operating member 27 which is urged by compression spring 28 to its uppermost position. The valve is so constructed that normally it shuts off communication between pipe 18 and the atmosphere. However, when member 27 is pushed downwardly by the operator, pipe line 18 is placed in communication with the atmosphere through the vent 29. The gauge 26 should be capable of indicating the pressure on the upstream side of the gate valve 10 when the valve is closed.

The apparatus described above is used with a suitable hydraulic system that can be coupled to the fittings 21 and 22 to supply liquid to and exhaust liquid from the pipes 16 and 17 for operation of the motor 12. This system can consist of a unit 30 which includes a liquid reservoir, a liquid pressure pump 31 of the positive displacement type which is either power or manually operated, and the four-way valve 32. Flexible hose lines 33 and 34 connect with the four-way valve 32 and are provided with coupling devices 36 and 37 capable of being coupled to the fittings 21 and 22. Both the fittings 21 and 22 and the coupling devices 36 and 37 are provided with spring-urged check valves (not shown) that are normally closed. However, when the attachment is made as shown in FIGURE 3, these valves are automatically opened to permit direct communication between the lines 16 and 17 and the flexible hoses 33 and 34. The four-way valve 32 is positioned by the operator to determine whether the valve is to be opened or closed. For one position of this four-way valve, liquid under pressure is applied to pipe line 17 and exhausted from line 16 whereby the valve gate is moved to the left as viewed in FIGURE 1. For the other operating position of the four-way valve 32, liquid under pressure is supplied to pipe 16 and exhausted from pipe 17.

Operation of the apparatus described above is as follows. Assuming that it is desired to carry out a cycle of operation of the valve 10, the unit 30 is moved to a position adjacent the box 13 and the cover 14 is removed to permit the hoses 33 and 34 to be coupled to the fittings 21 and 22. The vent valve 24 is now operated by pressing the member 27 and holding it in venting position for a short interval to permit the body pressure of the valve as shown by gauge 26 to drop to atmospheric. Assuming now that it is desired to move the gate valve from open to close position, the operator properly positions the four-way valve 32 and operates the unit 31 to supply liquid under pressure to the pipe line 17, and to simultaneously exhaust liquid through the line 16 back to the reservoir of unit 30. As the grate starts to move to closed position, the body space is placed in communication with the main line whereby the pressure as shown by gauge 26 increases to a value corresponding to the main line pressure. This indicates to the operator that the gate is being moved to a closed position. When the gate of the valve 10 discontinues its movement toward closed position, the operator can be apprised of this fact in various ways. For example, assuming that the hydraulic pump continues to operate, the pressure on the discharge side of this pump reaches a value such that it is by-passed through a pressure relief means to the liquid reservoir. This condition can be detected audibly, or by reference to a pressure gauge 38 connected to the discharge side of the pump. At that time the operator again depresses the member 27 of the vent valve 24, and if the gate is in closed position the pressure in the valve body space drops to atmospheric, as is indicated by the gauge 26. The operator is therefore assured of the fact that the valve is fully closed and is not leaking. When it is desired to open the gate valve 10, the operation is similar to that just described except for the positioning of the four-way valve 32.

When the coupling devices 36 and 37 are removed from the fittings 21 and 22, the valves within these fittings are automatically closed, thereby locking the motor 12 and the gate against movement. Likewise the valves in the coupling devices 36 and 37 are automatically closed, thus retaining hydraulic liquid within the hoses 33 and 34.

In some instances it may be desirable to provide indication at a remote point and also means at the remote point to check as to whether or not the gate valve 10 is leaking. This is possible with the arrangement of FIGURE 4. The vent valve 24 in this instance is shown provided with the solenoid operator 41. Also a fluid pressure operated electrical switch 42 is in communication with pipe 18 together with the vent valve 24 and the gauge 26. The terminals of the solenoid 41 connect with an electrical circuit 43 which also includes the switch 44 operated by push button 45, and the power supply lines L–1 and L–2. The terminals of the pressure operated switch 42 are connected to a circuit 46 which also includes the signal lamp 47 and the power supply lines L–1 and L–2. The switch 44 and the lamp 47 are at a point remote from the gate valve 10 and the box 13. Assuming now that personnel at the remote point desires to determine whether or not the gate valve 10 is leaking, operation of button 45 closes switch 44, thus energizing the solenoid 41 and operating the vent valve 24 to establish communication between pipe 18 and the atmosphere. The pressure switch 42 is adjusted whereby its contacts are open when atmospheric pressure is applied, but the contacts are closed when the applied fluid pressure is substantially above atmospheric. Thus if when the vent valve 24 is operated the pressure in line 18 falls to atmospheric, the contacts of switch 42 are open and the lamp 47 is not illuminated. However, if the lamp 47 remains illuminated or if it is illuminated after a short interval following operation of the vent valve, then operating personnel is apprised of the fact that the valve 10 is leaking.

While I prefer to employ gate valves of the ported gate type, it is possible to employ gate valves having similar sealing assemblies but of the short gate type. When such valves are open the body space is in free communication with the flow passages. When closed a seal is maintained on the upstream side of the gate, and the pressure in the body space can be reduced to atmospheric by operation of the vent valve 24. Thus if the valve is closed and the vent valve 24 operated to reduce the indicated body pressure to atmospheric, subsequent movement of the gate toward open position is indicated by a sudden increase in the body pressure to that of the line. If the valve is in open position, the body space cannot be vented to atmospheric pressure by operating valve 24. However, when moved to closed position, this is indicated to the operator in that the body pressure can now be reduced to atmospheric by operating valve 24.

I claim:

1. In apparatus for effecting opening and closing of buried or submerged gate valves of the type having a body defining a body space, a gate movable in said body space between open and closed positions and sealing assemblies on opposite sides of the gate for establishing sealing relationship between the body and the gate and to establish a seal on the upstream side when the gate is closed, said gate providing communication between said upstream side and said body space during at least a portion of its movement between open and closed positions, the valve being provided with a double-acting hydraulic motor for moving the gate between full open and closed positions, the improvement comprising means forming an operating station at the surface of the ground, two hydraulic pipe lines connected to the hydraulic motor and terminating at the operating station, said pipe lines forming extended hydraulic connections between the motor and the station and adapted to alternately exhaust hydraulic liquid from and to supply hydraulic liquid to the motor, coupling fittings on the ends of the pipelines at said station, means at said station for temporarily coupling the fittings to a hydraulic pressure system whereby the hydraulic motor can be energized to operate the gate valve between full open and closed positions, a third pipe line connected to the body space of the gate valve and terminating at said station, and selectively operable valve means at the operating station for venting said third pipe line.

2. Apparatus as in claim 1 together with means at said station for indicating the fluid pressure within said third line.

3. Apparatus as in claim 2 in which said indicating means consists of a pressure gauge.

4. Apparatus as in claim 2 in which said indicating means consists of a pressure operated switch actuated by hydraulic pressure within said third pipe line, and an indicating circuit controlled by said switch.

References Cited

UNITED STATES PATENTS

| | | | |
|---|---|---|---|
| 2,430,122 | 11/1947 | Grace | 137—551 |
| 2,641,279 | 6/1953 | Baldwin | 251—130 XR |
| 2,691,773 | 10/1954 | Lichtenberger | |
| 3,156,255 | 11/1964 | Gasquet et al. | 251—289 XR |
| 3,344,807 | 10/1967 | Lehrer et al. | 137—557 XR |
| 3,367,355 | 2/1968 | Anderson | 137—551 XR |

HENRY T. KLINKSIEK, Primary Examiner

U.S. Cl. X.R.

73—40.5; 137—557